(12) United States Patent
Graves et al.

(10) Patent No.: US 9,258,703 B2
(45) Date of Patent: Feb. 9, 2016

(54) METHOD, SYSTEM AND COMPUTER PROGRAM PRODUCT FOR WIRELESSLY CONNECTING A DEVICE TO A NETWORK

(75) Inventors: Jamie Lane Graves, Corinth, TX (US); David M. Newman, Sachse, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/484,568

(22) Filed: May 31, 2012

(65) Prior Publication Data

US 2013/0014224 A1 Jan. 10, 2013

Related U.S. Application Data

(60) Provisional application No. 61/504,436, filed on Jul. 5, 2011.

(51) Int. Cl.
| | |
|---|---|
| *H04L 29/06* | (2006.01) |
| *G06F 21/62* | (2013.01) |
| *H04W 12/06* | (2009.01) |
| *H04W 12/08* | (2009.01) |

(52) U.S. Cl.
CPC .......... *H04W 12/06* (2013.01); *G06F 21/6218* (2013.01); *H04L 63/08* (2013.01); *H04L 63/102* (2013.01); *H04L 63/105* (2013.01); *H04W 12/08* (2013.01)

(58) Field of Classification Search
USPC .......................................................... 726/4
See application file for complete search history.

(56) References Cited

U.S. PATENT DOCUMENTS

| | | | |
|---|---|---|---|
| 7,356,011 B1* | 4/2008 | Waters et al. ................. 370/338 |
| 7,502,863 B2* | 3/2009 | Sugihara et al. .............. 709/231 |
| 7,567,819 B2* | 7/2009 | Alone et al. ............... 455/552.1 |
| 7,681,231 B2* | 3/2010 | Combs et al. ..................... 726/5 |
| 7,826,845 B2* | 11/2010 | Chen ......................... 455/435.3 |
| 8,036,638 B2* | 10/2011 | Bjugan et al. ................. 455/410 |
| 8,041,035 B2* | 10/2011 | Miller ........................... 380/255 |
| 8,117,314 B2* | 2/2012 | Croft et al. .................... 709/227 |
| 8,416,782 B2* | 4/2013 | Kim et al. ..................... 370/392 |
| 2004/0168081 A1* | 8/2004 | Ladas et al. ................... 713/201 |
| 2005/0144189 A1* | 6/2005 | Edwards et al. .............. 707/102 |
| 2006/0084411 A1* | 4/2006 | Lo et al. ........................ 455/411 |
| 2006/0171537 A1* | 8/2006 | Enright ......................... 380/270 |
| 2007/0254614 A1* | 11/2007 | Muralidharan et al. ....... 455/307 |
| 2009/0064299 A1* | 3/2009 | Begorre et al. .................... 726/7 |
| 2009/0217033 A1* | 8/2009 | Costa et al. ................... 713/155 |
| 2010/0313082 A1* | 12/2010 | Kim et al. ....................... 714/57 |

(Continued)

*Primary Examiner* — Dede Zecher
*Assistant Examiner* — Jason C Chiang
(74) *Attorney, Agent, or Firm* — Michael A. Davis, Jr.; Frank D. Cimino (57) ABSTRACT

A device wirelessly receives first and second identifiers contemporaneously from a network. The first identifier indicates that the network operates in a first mode that is not secure. The second identifier indicates that the network operates in a second mode that is secure. In response to wirelessly receiving the first and second identifiers, the device wirelessly connects to the network in the first mode to determine whether the network accepts the device for the second mode, irrespective of whether the network previously accepted the device for the second mode, and irrespective of whether the device already stores authentication information for the second mode. In response to determining that the network accepts the device for the second mode, the device wirelessly connects to the network in the second mode to securely communicate with the network in response to the authentication information.

21 Claims, 6 Drawing Sheets

(56) References Cited

U.S. PATENT DOCUMENTS

| | | | |
|---|---|---|---|
| 2011/0081887 A1* | 4/2011 | Chakraborty et al. | 455/410 |
| 2011/0217688 A1* | 9/2011 | Neher | 434/365 |
| 2011/0235549 A1* | 9/2011 | Ahlers et al. | 370/255 |
| 2011/0296501 A1* | 12/2011 | Drovdahl et al. | 726/4 |
| 2012/0102550 A1* | 4/2012 | Newman et al. | 726/4 |
| 2012/0230193 A1* | 9/2012 | Fang | 370/235 |
| 2012/0232367 A1* | 9/2012 | Allegri et al. | 600/365 |
| 2012/0303476 A1* | 11/2012 | Krzyzanowski et al. | 705/26.5 |
| 2012/0317619 A1* | 12/2012 | Dattagupta et al. | 726/4 |
| 2013/0010958 A1* | 1/2013 | Yao | 380/270 |
| 2013/0014224 A1* | 1/2013 | Graves et al. | 726/4 |

* cited by examiner

FIG. 8

METHOD, SYSTEM AND COMPUTER PROGRAM PRODUCT FOR WIRELESSLY CONNECTING A DEVICE TO A NETWORK

CROSS-REFERENCE TO RELATED APPLICATION

This application claims priority to U.S. Provisional Patent Application Ser. No. 61/504,436, filed Jul. 5, 2011, entitled DUAL NETWORK OPTIMIZATION FOR CLASSROOM NETWORKS, naming Jamie Lane Graves et al. as inventors, which is hereby fully incorporated herein by reference for all purposes.

BACKGROUND

The disclosures herein relate in general to information handling systems, and in particular to a method, system and computer program product for wirelessly connecting a device to a network.

Networks can wirelessly communicate information within overlapping areas (e.g., within a building, such as a school), so that various devices (e.g., handheld computing devices) within the overlapping areas may simultaneously communicate information through the networks. In one example, the networks are respectively associated with different regions of the overlapping areas (e.g., with different regions of a school, such as different floors or classrooms of the school), so that devices located within a particular region may be: (a) accepted for wireless connection to the particular region's associated network (e.g., in response to approval by a human operator of such network); and (b) rejected for wireless connection to another region's associated network. In that example, if a device is located within the particular region, then such device wirelessly connects to the particular region's associated network instead of another region's associated network.

If a number of such devices increases within the particular region, then such wireless connection (for all such devices aggregately) becomes more time-consuming. For example, if various students (e.g., 30 students) in a particular classroom have respective devices for wireless connection to the classroom's associated network, then each device: (a) distinguishes the classroom's associated network from other classrooms' associated networks that operate within the overlapping areas; and (b) attempts wireless connection to the classroom's associated network. If such wireless connection (for all such devices aggregately) becomes more time-consuming, then it likewise becomes more disruptive of the classroom's normal activity, especially if the classroom's normal activity has a fixed duration (e.g., 60-minute class period) that is partly consumed by establishing such wireless connection (for all such devices aggregately).

SUMMARY

A device wirelessly receives first and second identifiers contemporaneously from a network. The first identifier indicates that the network operates in a first mode that is not secure. The second identifier indicates that the network operates in a second mode that is secure. In response to wirelessly receiving the first and second identifiers, the device wirelessly connects to the network in the first mode to determine whether the network accepts the device for the second mode, irrespective of whether the network previously accepted the device for the second mode, and irrespective of whether the device already stores authentication information for the second mode. In response to determining that the network accepts the device for the second mode, the device wirelessly connects to the network in the second mode to securely communicate with the network in response to the authentication information.

DETAILED DESCRIPTION

Figure 1A:
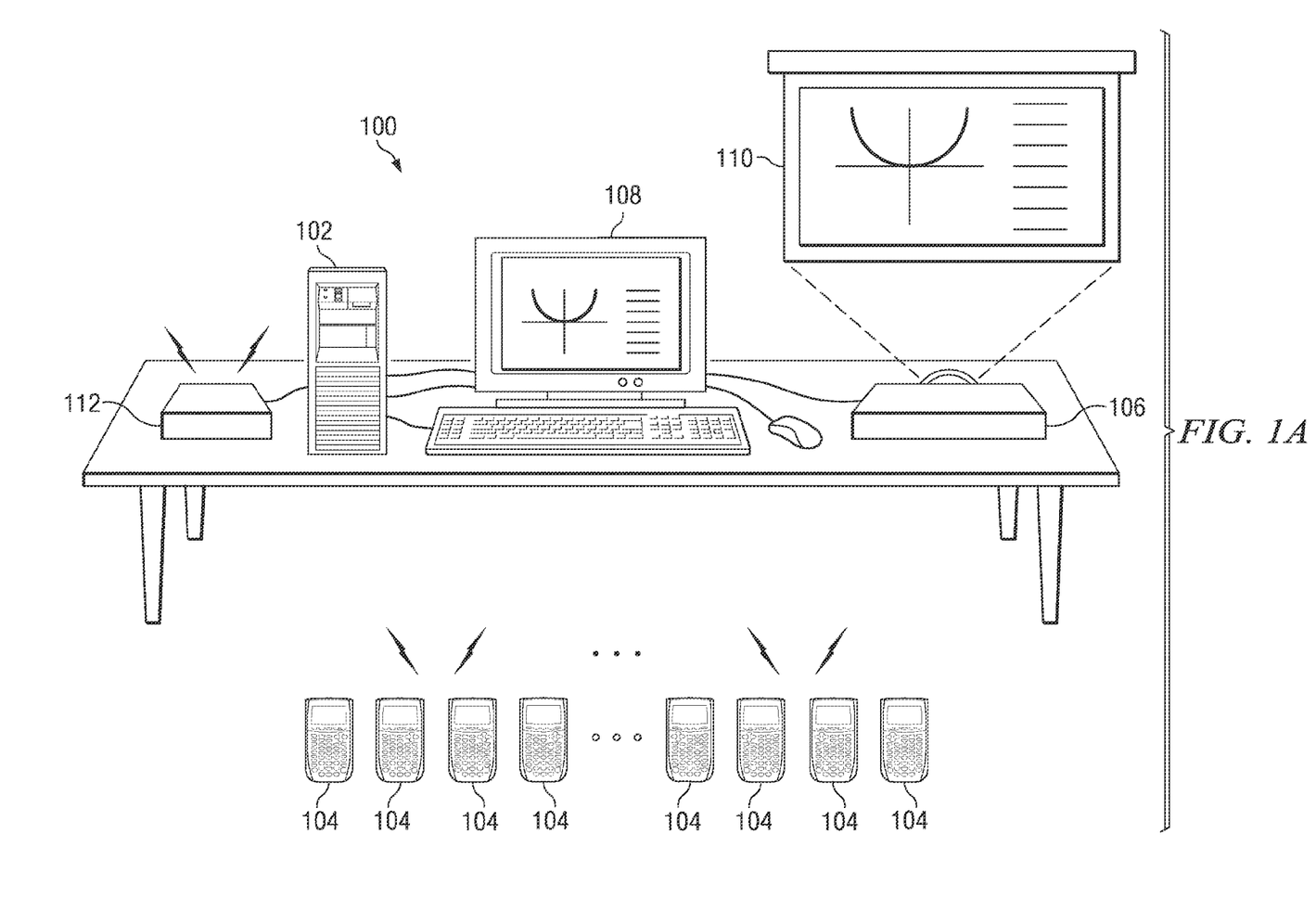
FIG. 1A is a first diagram of an information handling system of the illustrative embodiments.

FIG. 1A is a first diagram of an information handling system, indicated generally at 100, of the illustrative embodiments. The system 100 is formed by electronic circuitry components for performing the system 100 operations. The system 100 includes a computer 102, which is a general purpose computing device (e.g., tablet computer, netbook, laptop computer, desktop computer, minicomputer, or mainframe computer).

The computer 102 performs its operations in response to instructions of a computer-readable program that is stored on a computer-readable medium (e.g., hard disk drive, flash memory card, or other nonvolatile storage device) of the computer 102. Such program includes software for managing a display of screen content (e.g., from devices 104) by: (a) a projector 106 (e.g., a digital projector); and/or (b) a display device 108 (e.g., computer monitor, television, and/or interactive whiteboard). In response to signals from the computer 102, the projector 106 projects images and video (which the projector 106 receives from the computer 102) onto a screen 110 (or, alternatively, onto a wall or other surface).

Also, the computer 102 is coupled through a universal serial bus ("USB") to an access point 112. Through the access point 112, the computer 102 and a representative one of the devices 104: (a) establish a wireless connection to one another; and (b) after establishing such connection, bi-directionally communicate with one another by outputting information to (and receiving information from) one another. Such communication is performed according to the Institute of Electrical and Electronics Engineers ("IEEE") 802.11b standard, the IEEE 802.11g standard, or other wireless communications protocol.

In a first embodiment, the computer 102 and the access point 112 (collectively "network host") are distinct from one another, and they are coupled to one another through either a wire connection (as shown in FIG. 1A) or a wireless connection. In a second embodiment, the access point 112 is integral with the computer 102. The devices 104 are any suitable portable handheld computing devices, such as graphing calculators in the TI-Nspire product line available from Texas Instruments Incorporated. For wireless communication with the network host, each device 104 has a respectively associated wireless transceiver, which is either: (a) integral with such device 104; or (b) coupled to such device 104 through an external cradle or other adapter (e.g., via a docking connector on such device 104).

Figure 1B:
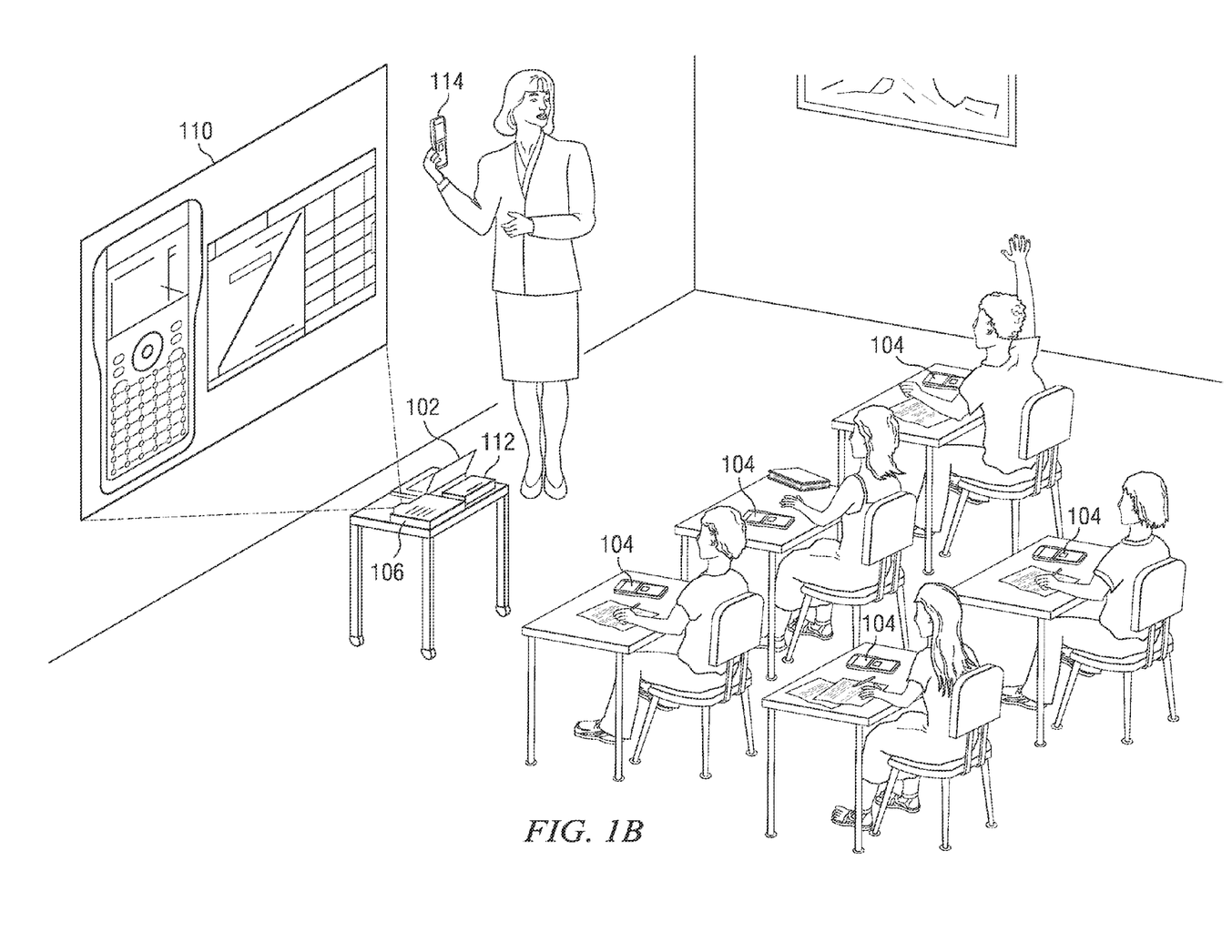
FIG. 1B is a second diagram of the system of FIG. 1A.

FIG. 1B is a second diagram of the system 100. In the example of FIG. 1B, the computer 102 is a laptop computer (so that the display device 108 is integral with the computer 102). As shown in FIG. 1B: (a) the devices 104 operate in association with respective human students; and (b) a handheld computing device 114 operates in association with a human instructor. In the illustrative embodiments, the devices 104 and 114 are handheld computing devices, such as handheld learning devices (e.g., calculators), smartphones, tablet computers, netbooks, and laptop computers. In alternative embodiments, the devices 104 and 114 include other types of wireless electronic devices, such as desktop computers.

Through the access point 112, the computer 102 is wirelessly connected to the devices 104 and 114. In response to instructions of software for managing a display of screen content, the computer 102 outputs signals for causing: (a) the display device 108 to display such content; and (b) the projector 106 to project such content onto the screen 110. In the example of FIG. 1B, such content includes: (a) content from a screen of the device 114; and (b) content that depicts a visual appearance of the device 114.

Figure 2:
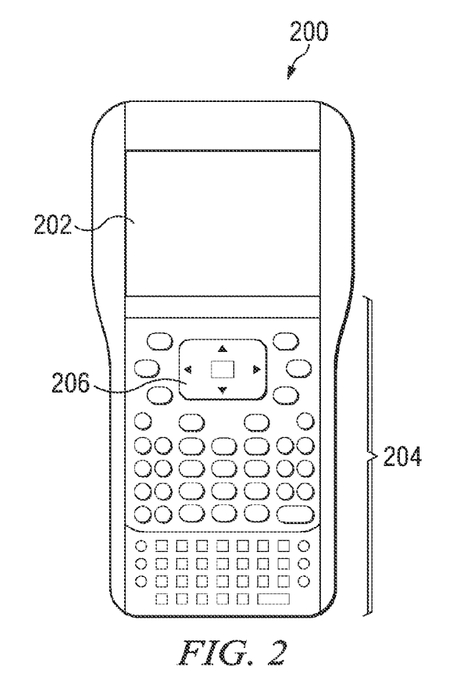
FIG. 2 is a diagram of a representative handheld computing device of the system of FIG. 1A.

FIG. 2 is a diagram of a representative one of the devices 104, indicated generally at 200, of the system 100. In the illustrative embodiment, the device 200 is a graphing calculator available from Texas Instruments Incorporated. As shown in FIG. 2, the device 200 includes: (a) a graphical display 202; and (b) a keypad 204 that includes a touchpad 206.

The device 200 executes software applications, in response to information (e.g., data and instructions) that a human operator (e.g., student or instructor) specifies via the keypad 204 (e.g., via an alphanumeric keyboard of the keypad 204). The touchpad 206 translates motion and position of the human operator's finger(s), so that the human operator may interact with the display 202, in a manner similar to an external pointing device (e.g., mouse). Accordingly, by suitably operating the touchpad 206, the human operator is able to: (a) reposition a pointer on the display 202; and (b) scroll, select and/or highlight content on the display 202.

In one example, the display 202 is a liquid crystal display ("LCD") device. Through the display 202, the device 200 displays information to the human operator. Such information includes: (a) information that the device 200 receives from the human operator via the keypad 204; and (b) images and alphanumeric text that the device 200 outputs in response to its execution of software applications.

Figure 3:
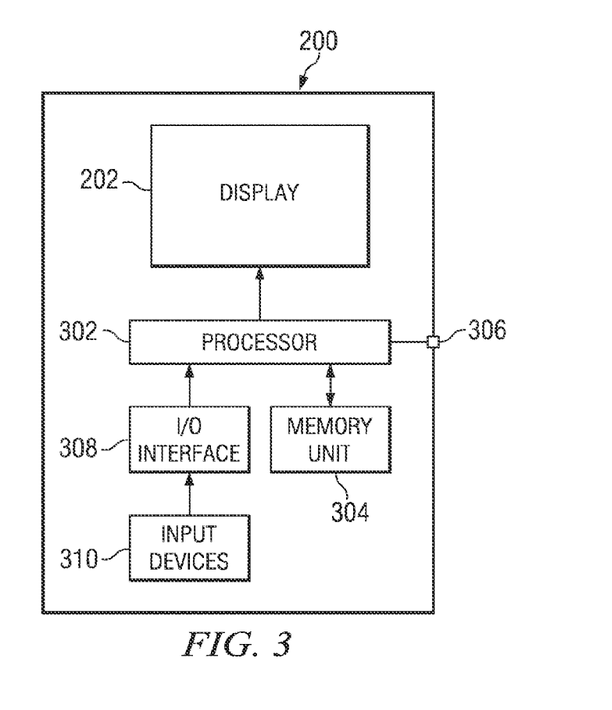
FIG. 3 is a block diagram of the device of FIG. 2.
Figure 4:
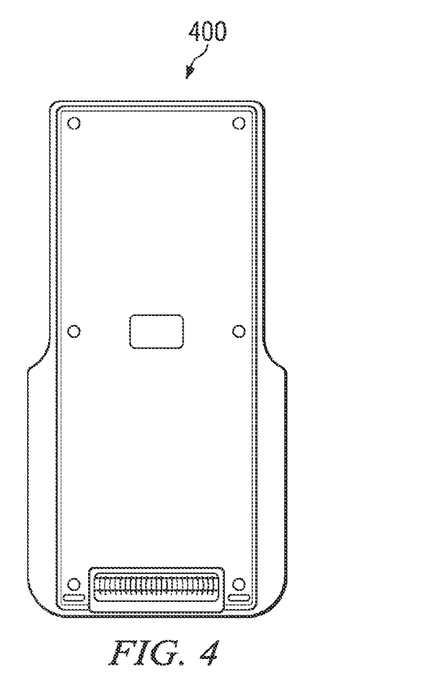
FIG. 4 is a diagram of a cradle for the device of FIG. 2.

FIG. 3 is a block diagram of the device 200, which is an information handling system. FIG. 4 is a diagram of a cradle, indicated generally at 400, for the device 200. As shown in FIG. 3, the device 200 includes a processor 302 coupled to a memory unit 304. For example, in one embodiment, the memory unit 304 includes: (a) a read only memory ("ROM") for storing software instructions that the processor 302 executes in operation of the device 200; and (b) a random access memory ("RAM") for storing intermediate data and other results of such operation.

Through an input/output port 306 (e.g., a bidirectional connector, such as a mini-A USB port), the device 200 is removably connectable to other components, such as the cradle 400 (which operates as a wireless interface for the device 200). In an alternative embodiment, the device 200 and the cradle 400 are integral with one another. Also, the device 200 includes: (a) the display 202; and an I/O interface 308 for connecting the processor 302 to input devices 310 (e.g., the keypad 204 and the touchpad 206).

Figure 5:
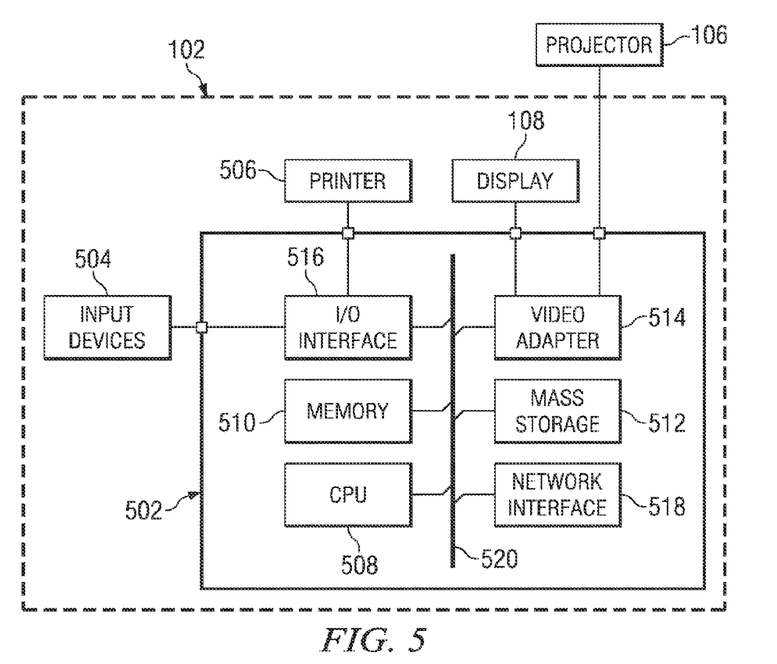
FIG. 5 is a block diagram of a computer of the system of FIG. 1A.

FIG. 5 is a block diagram of the computer 102, which is an information handling system. As shown in FIG. 5, the computer 102 includes: (a) a processing unit 502; (b) input devices 504 (e.g., a mouse and a keyboard); and (c) output devices, such as the display device 108 and a printer 506. In one embodiment, the display device 108 includes a touchscreen, which operates as one of the input devices 504.

In the illustrative embodiments, the processing unit 502 is a general purpose desktop, workstation or laptop computer. In an alternative embodiment, the processing unit 502 is a special purpose computer. The processing unit 502 includes at least the following components: (a) a central processing unit ("CPU") 508; (b) a memory 510; (c) a mass storage device 512; (d) a video adapter 514; (e) an I/O interface 516; and (f) a network interface 518. Such components are coupled to one another through a bus 520.

Through the bus 520 and the video adapter 514, the processing unit 502 outputs information for display to humans (e.g., instructors and/or students) via the projector 106 and the display device 108. Through the bus 520 and the I/O interface 516, the processing unit 502: (a) receives information from such humans via the input devices 504; and (b) optionally, outputs information for printing on paper via the printer 506. Through the bus 520 and the network interface 518, the processing unit 502 wirelessly communicates (e.g., outputs information to, and receives information from) with the devices 200 and 114 via a network of the system 100 ("the system 100 network").

The memory 510 includes static RAM ("SRAM"), dynamic RAM ("DRAM"), synchronous DRAM ("SDRAM"), and/or read only memory ("ROM"). For example, in one embodiment, the memory 510 includes: (a) ROM for storing software instructions that the CPU 508 executes in operation of the computer 102; and (b) RAM for storing intermediate data and other results of such operation. Also, the mass storage device 512 is a computer-readable medium for storing information (e.g., software instructions, intermediate data and other results) for such operation, and such information from the mass storage device 512 is accessible to the CPU 508 (and other components of the processing unit 502) through the bus 520.

The bus 520 has a bus architecture, such as a memory bus architecture, a memory controller bus architecture, a peripheral bus architecture, or a video bus architecture. In the illustrative embodiments, the CPU 508 is a general purpose processor. In an alternative embodiment, the CPU 508 is an application-specific integrated circuit ("ASIC").

Figure 6:
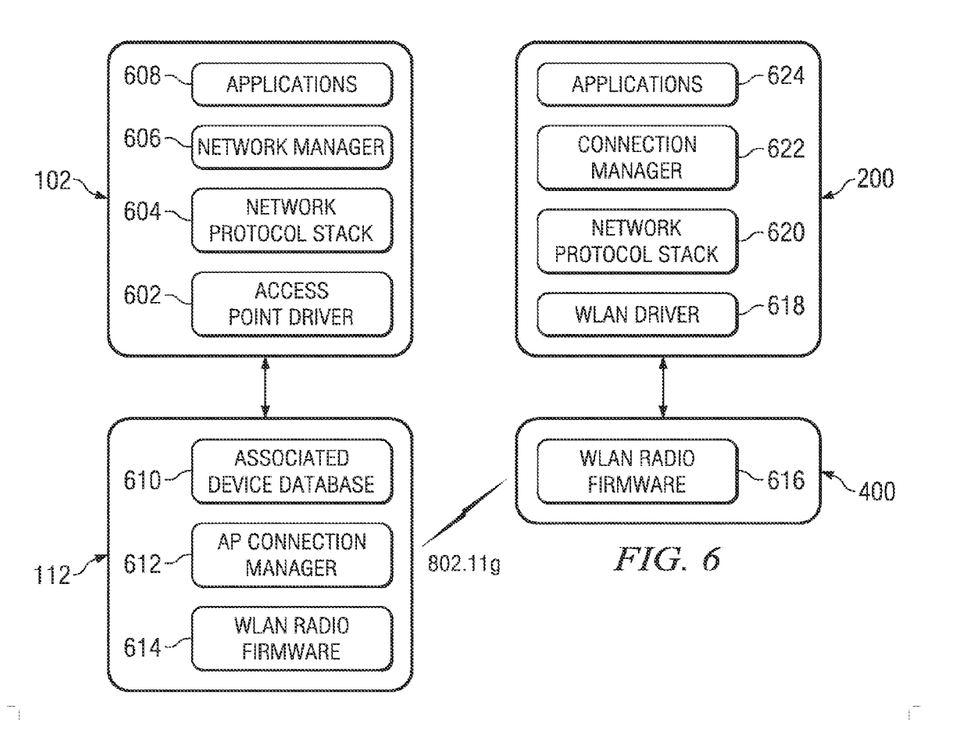
FIG. 6 is a data flow diagram of the system of FIG. 1A.

FIG. 6 is a data flow diagram of the system 100. As shown in FIG. 6, the computer 102 executes an access point driver process 602, a network protocol stack process 604, a network manager process 606, and various applications 608. By executing the access point driver process 602, the computer 102 bidirectionally communicates with the access point 112. Such communication includes: (a) outputting commands and other information from the network manager process 606 to the access point 112; (b) outputting commands and other information from the applications 608 to the device 200; and (c) receiving commands and other information from the device 200 to the applications 608.

By executing the network protocol stack process 604, the computer 102 implements protocols of the system 100 network, so that the computer 102 performs communication services of the network manager process 606 and the applications 608. Such protocols include transmission control protocol ("TCP"), user datagram protocol ("UDP"), internet protocol ("IP"), custom protocols, and/or a combination thereof. By executing the network manager process 606, the computer 102 allows a human operator (e.g., the instructor of FIG. 1B or a network administrator) to manage the system 100 network.

For example, by executing the network manager process 606, the computer 102: (a) displays (to the human operator) identification information of devices that request association with the system 100 network; (b) receives (from the human operator) a specification of whether and when particular devices are associated with the system 100 network; and (c) outputs such specification to the access point 112 for storage within an associated device database 610 of the access point 112. In one embodiment, human instructors in multiple classrooms (e.g., nearby or adjacent classrooms) share the system 100 network, so that the computer 102 is operated by either (or both) of those instructors for such classrooms jointly. In another embodiment, the human operator (via operation of a central server computer) specifies whether (and which and when) devices are associated with the system 100 network and/or with one or more other networks that wirelessly communicate within overlapping areas (collectively "association information"), so that the system 100 network and such other networks: (a) receive such association information from the central server computer; and (b) in response thereto, respectively accept or reject such devices for the normal mode. In one example, the device 200 is associated with: (a) the system 100 network during only a first period of time (e.g., a first classroom period) each weekday; (b) another network during only a second period of time (e.g., a second classroom period) each weekday; and (c) yet another network during only a third period of time (e.g., a third classroom period) each weekday.

By executing the applications 608, the computer 102 performs various operations for management of a classroom, in response to commands from a human instructor. In one embodiment, such operations include: (a) creating documents; (b) outputting such documents to the device 200; (c) receiving documents from the device 200; and (d) automatically grading such received documents. Also, such operations include: (a) creating and managing a classroom roster and student portfolio; (b) outputting a list of the devices 200 for display to the human instructor, including whether such devices are then-currently connected to the system 100 network; and (c) monitoring progress of students via the devices 200.

The access point 112 executes an access point ("AP") connection manager process 612 and wireless local area network ("WLAN") radio firmware 614. By executing the WLAN radio firmware 614, the access point 112 performs wireless routing of information between the access point 112 and the device 200. By executing the AP connection manager process 612, the access point 112 manages wireless connections between the access point 112 and the device 200, in accordance with the system 100 network's mode of operation.

For example, the access point 112 executes the AP connection manager process 612 to wirelessly output a service set identifier ("SSID") that uniquely identifies the system 100 network. Accordingly, even if the system 100 network and other networks wirelessly communicate information within overlapping areas, the SSID distinguishes the system 100 network from such other networks. The device 200 receives the SSID, which also indicates the system 100 network's mode of operation.

In response to the SSID, the device 200: (a) decodes such mode; and (b) in accordance with such mode, attempts wireless connection to the system 100 network (e.g., by attempting wireless connection to the computer 102 through the access point 112), and performs its subsequent operations. By attempting such connection in accordance with such mode, such connection is less time-consuming (e.g., for the device 200, and likewise for a large number of such devices aggregately), because the device 200 avoids wasting attempts to establish such connection in accordance with a wrong mode.

In the illustrative embodiments, the modes of operation include a configuration mode and a normal mode. For example: (a) if the SSID includes a first designated character (e.g., "S") in a predetermined position, then the SSID indicates the configuration mode, which is non-secure (e.g., not secured by confidential password, and not secured by encryption key); or (b) if the SSID includes a second designated character (e.g., "N") in the predetermined position, then the SSID indicates the normal mode, which is secured by confidential password(s) and/or encryption key(s). For additional modes of operation, the SSID includes a different designated character in the predetermined position.

In the configuration mode, the device 200: (a) wirelessly connects to the system 100 network; and (b) after establishing such connection, receives exchange information and security keys from the access point 112, but only if the access point 112 accepts the device 200 for the normal mode. In the normal mode, the device 200: (a) wirelessly connects to the system 100 network, in accordance with such exchange information and security keys; and (b) after establishing such connection, performs various operations by exchanging information (e.g., documents, questions and answers) with the computer 102 through the access point 112, in accordance with such exchange information and security keys. Accordingly, such exchange information and security keys enable wireless connection of the device 200 to the system 100 network (and performing various operations of the device 200) for the normal mode.

By executing the AP connection manager process 612, the access point 112: (a) detects the device 200 attempting wireless connection to the system 100 network in the configuration mode; and (b) in response thereto, outputs a suitable message to the computer 102, including a media access control ("MAC") address of the device 200 and/or an identifier of the cradle 400. By executing the network manager process 606, the computer 102: (a) receives such message from the access point 112; and (b) in response thereto, outputs a query for display to the human operator (via the display device 108 of the computer 102). Such query asks the human operator to specify (via the input devices 504 of the computer 102) whether and when the device 200 is associated with the system 100 network.

In response to such query: (a) the human operator specifies (via the input devices 504 of the computer 102) whether and when the device 200 is associated with the system 100 network; and (b) in response thereto, the computer 102 (by executing the network manager process 606) outputs a suitable command to the access point 112. By executing the AP connection manager process 612, the access point 112: (a) receives such command from the computer 102; and (b) in response thereto, automatically either accepts (if such command indicates that the device 200 is associated with the system 100 network during the then-current period of time) or rejects (if such command indicates that the device 200 is not associated with the system 100 network during the then-current period of time) the device 200 for the normal mode. If the access point 112 accepts the device 200 for the normal mode, then the access point 112 (by executing the AP connection manager process 612) stores the MAC address of the device 200 in the associated device database 610.

In that manner, the access point 112 stores the configuration mode's results (e.g., MAC address for each associated device) in the associated device database 610. Subsequently, for wireless connection of the device 200 to the system 100 network in either the configuration mode or the normal mode, the access point 112 (by executing the AP connection manager process 612) determines whether an identity of the device 200 is already validated for such connection during the then-current period of time. For example, if the stored MAC address (which the access point 112 received from the device 200 in the configuration mode) is equal to the then-current MAC address of the device 200 (which the access point 112 receives from the device 200 in either the configuration mode or the normal mode), then the access point 112 determines that the identity of the device 200 is already so validated for such connection (so that additional query of the human operator is unnecessary for such determination).

The cradle 400 (which operates as a wireless interface for the device 200) includes WLAN radio firmware 616. By executing the WLAN radio firmware 616, the cradle 400 performs wireless routing between the device 200 and the access point 112. The device 200 executes a WLAN driver process 618, a network protocol stack process 620, a connection manager process 622, and various applications 624.

By executing the applications 624, the device 200 performs various operations, such as calculations, function graphing, geometry, and statistical analysis. By executing the WLAN driver process 618 (in response to execution of the applications 624), the device 200: (a) communicates with the cradle 400 to suitably configure various parameters (e.g., security protocol and radio channel) of the WLAN radio firmware 616; and (b) via the cradle 400, wirelessly communicates with the access point 112. By executing the network protocol stack process 620, the device 200 implements protocols of the system 100 network, so that the device 200 performs communication services of the connection manager process 622 and the applications 624. By executing the connection manager process 622, the device 200 manages wireless connections between the device 200 and the access point 112, in accordance with the system 100 network's mode of operation (e.g., in response to whether the SSID includes the first or second designated character in the predetermined position, as discussed hereinabove).

Figure 7:
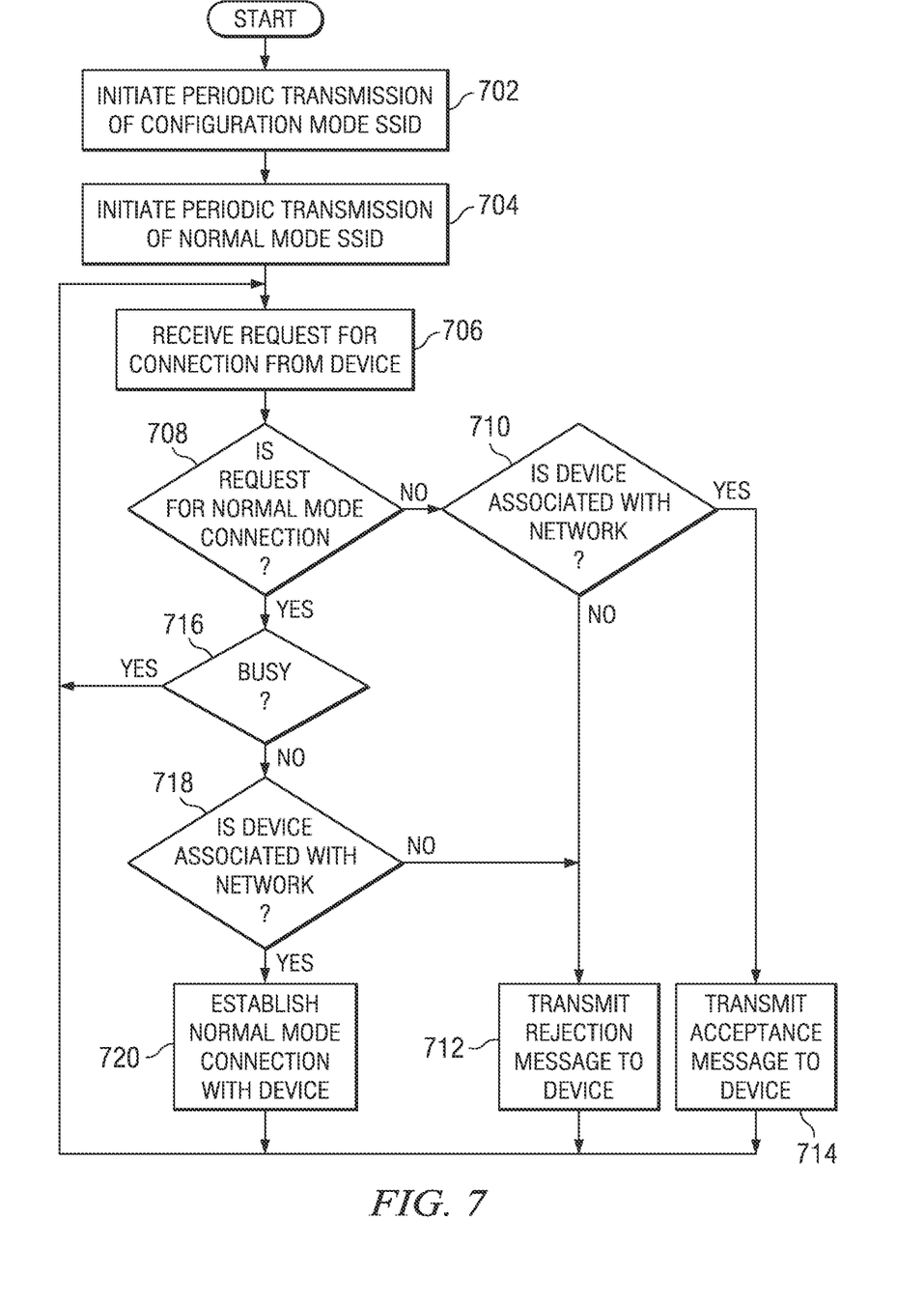
FIG. 7 is a flowchart of operation of a network host of the system of FIG. 1A.

FIG. 7 is a flowchart of operation of the network host (e.g., the computer 102 and the access point 112). The operation begins at a step 702, at which the network host initiates a periodic wireless transmission of its configuration mode SSID, which includes the first designated character (e.g., "S") in a predetermined position. At a next step 704, the network host initiates a periodic wireless transmission of its normal mode SSID, which includes the second designated character (e.g., "N") in the predetermined position. Accordingly, throughout its operation, the network host wirelessly transmits its configuration mode SSID and its normal mode SSID contemporaneously (e.g., substantially concurrent with one another) on a periodic basis, so that each SSID uniquely identifies its own respective virtual local area network ("LAN") within the system 100 network.

At a next step 706, the network host receives a request for wireless connection from the device 200. At a next step 708, the network host determines whether the request is for wireless connection in the normal mode. In response to the network host determining that the request is for wireless connection in other than the normal mode (e.g., if the request is for wireless connection in the configuration mode), the operation continues to a step 710.

At the step 710, the network host determines whether the device 200 is associated with the system 100 network during the then-current period of time (e.g., as discussed hereinabove in connection with the network manager process 606 of FIG. 6). In response to the network host determining that the device 200 is not associated with the system 100 network during the then-current period of time, the operation continues to a step 712. At the step 712, the network host rejects the device 200 for the normal mode, so that the network host transmits a rejection message to the device 200 (which, in turn, receives the rejection message). After the step 712, the operation returns to the step 706 (e.g., for the network host to receive a request for wireless connection from another one of the devices 104).

Conversely, in response to the network host determining that the device 200 is associated with the system 100 network during the then-current period of time, the operation continues from the step 710 to a step 714. At the step 714, the network host transmits an acceptance message to the device 200 (which, in turn, receives and stores the acceptance message). After the step 714, the operation returns to the step 706.

In the acceptance message, the network host specifies confidential authentication information (e.g., various security protocols, such as confidential passwords and/or encryption keys) and a waiting period for the device 200 to wait between: (a) an attempted, yet unsuccessful, wireless connection of the device 200 to the system 100 network in the normal mode; and (b) a next attempted wireless connection of the device 200 to the system 100 network in the normal mode. By specifying the waiting period, the network host achieves more efficient management of such attempted wireless connections in the normal mode, especially if the network host is receiving various requests for wireless connection in the normal mode from several of the devices 104 within a limited period of time (e.g., at the beginning of a class period within a classroom). In one example, the network host specifies respective waiting periods for the devices 104, so that the network host specifies: (a) a first waiting period for a first one of the devices 104; (b) a second waiting period (longer than the first waiting period) for a second one of the devices 104; (c) a third waiting period (longer than the first and second waiting periods) for a third one of the devices 104; and (d) successively longer waiting periods for additional ones of the devices 104.

Referring again to the step 708, in response to the network host determining that the request is for wireless connection in the normal mode, the operation continues from the step 708 to a step 716. At the step 716, in response to the network host being then-currently busy (e.g., to an extent that interferes with its timely establishment of wireless connection to the device 200 in the normal mode), the operation returns from the step 716 to the step 706. For example, such connection in the normal mode includes various security protocols, which can be time intensive.

Accordingly, if the operation so returns from the step 716 to the step 706, then: (a) such attempted wireless connection (of the device 200 to the system 100 network in the normal mode) is unsuccessful; and (b) after a waiting period, the device 200 will make its next attempted wireless connection to the system 100 network in the normal mode. Conversely, in response to the network host not being so then-currently busy, the operation continues from the step 716 to a step 718.

At the step 718, the network host determines whether the device 200 is associated with the system 100 network during the then-current period of time (e.g., as discussed hereinabove in connection with the network manager process 606 of FIG. 6). In response to the network host determining that the device 200 is not associated with the system 100 network during the then-current period of time, the operation continues to the step 712. Conversely, in response to the network host determining that the device 200 is associated with the system 100 network during the then-current period of time, the operation continues from the step 718 to a step 720. At the step 720, the network host accepts the device 200 for the normal mode, so that: (a) the network host establishes wireless connection to the device 200 in the normal mode; and (b) accordingly, the network host and the device 200 securely communicate with one another in response to the confidential authentication information. After the step 720, the operation returns to the step 706.

Figure 8:
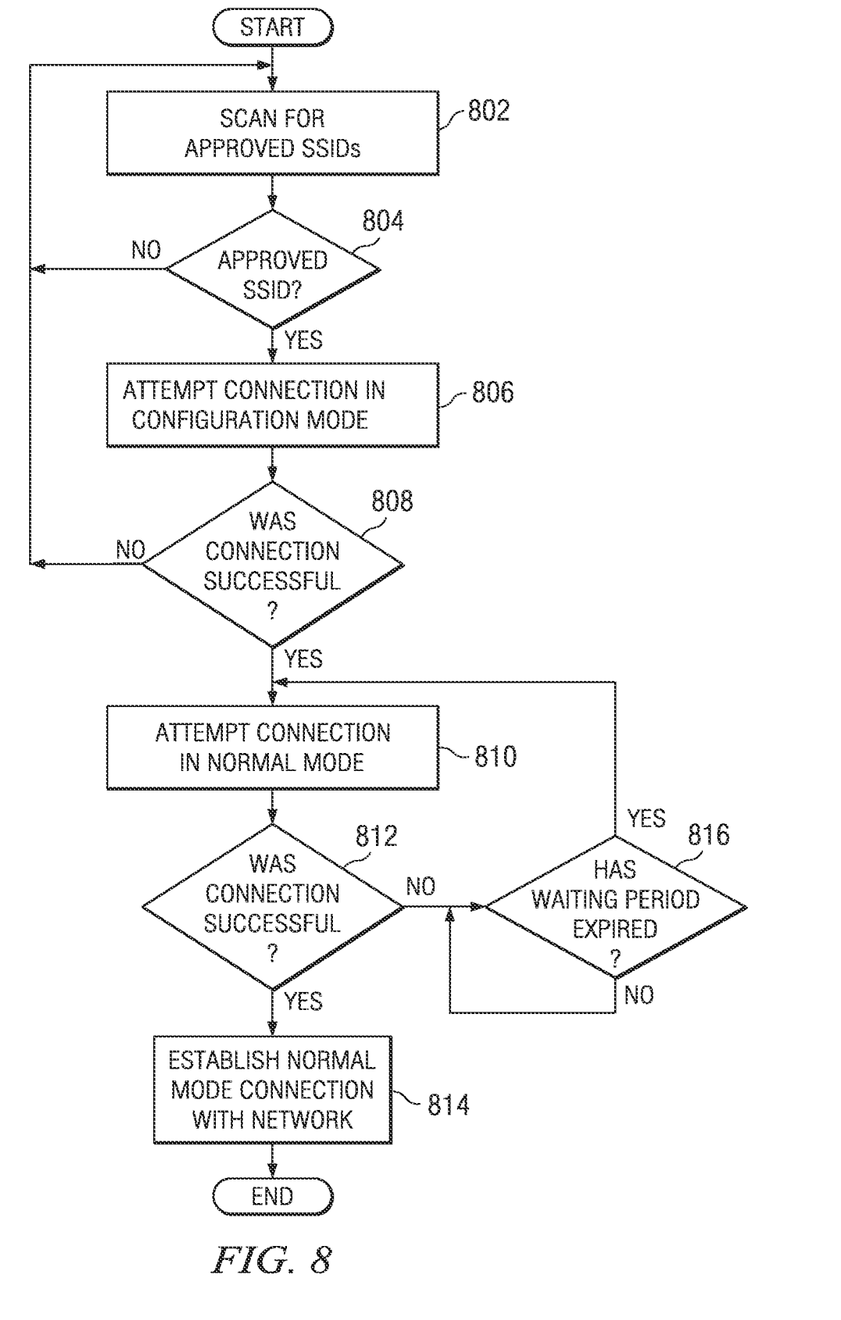
FIG. 8 is a flowchart of operation of the device of FIG. 2.

FIG. 8 is a flowchart of operation of the device 200 for association with the system 100 network. The operation begins at a step 802, at which the device 200 wirelessly scans applicable communication frequencies to detect approved SSIDs from networks (e.g., classroom networks). An SSID is approved if the SSID has a predetermined format. In one example, the predetermined format of an approved SSID includes a prefix that identifies the network as a classroom network (e.g., "TI-NAV-S" or "TI-NAV-N"), followed by one or more characters that specifically identify the classroom network (e.g., the system 100 network). In such example, the last character in the prefix (e.g., "S" or "N") indicates the mode of a network, so that: (a) if the last character in the prefix is "S," then the SSID indicates the configuration mode of such network; or (b) if the last character in the prefix is "N," then the SSID indicates the normal mode of such network.

At a next step 804, the device 200 determines whether it has detected an approved SSID from a network. In response to the device 200 determining that it has not detected an approved SSID from a network, the operation returns to the step 802. Conversely, in response to the device 200 determining that it has detected an approved SSID from a network, the operation continues to a step 806.

At the step 806, the device 200 attempts wireless connection to such network in the configuration mode (e.g., by wirelessly transmitting the MAC address of the device 200 and generic non-confidential authentication information, such as a generic non-confidential password, to the network host of such network). The device 200 so performs the step 806, irrespective of whether (e.g., even if): (a) the device 200 has already been associated with such network; (b) such network previously accepted the device 200 for the normal mode; (c) the device 200 already stores then-currently effective confidential authentication information (e.g., from such network) for the normal mode; and/or (d) in response to such confidential authentication information, the device 200 previously connected to such network in the normal mode with success (e.g., during a preceding day).

At a next step 808, the device 200 determines whether such attempted wireless connection was successful in the configuration mode (e.g., whether successful before expiration of a timeout period). In response to the device 200 determining that such attempted wireless connection was unsuccessful in the configuration mode (e.g., the device 200 has received the rejection message from such network, as discussed hereinabove in connection with the step 712 of FIG. 7), the operation returns to the step 802 (e.g., for the device 200 to detect and attempt wireless connection to another network). Conversely, in response to the device 200 determining that such attempted wireless connection was successful in the configuration mode (e.g., the device 200 has received and stored the acceptance message from such network, as discussed hereinabove in connection with the step 714 of FIG. 7), the operation continues to a step 810.

At the step 810, the device 200: (a) disconnects from such network in the configuration mode; and (b) attempts wireless connection to the same network in the normal mode (e.g., by wirelessly transmitting the MAC address of the device 200 and the confidential authentication information to the network host of such network). At a next step 812, the device 200 determines whether such attempted wireless connection was successful in the normal mode (e.g., whether successful before expiration of a timeout period). In response to the device 200 determining that such attempted wireless connection was successful in the normal mode, the operation continues to a step 814.

At the step 814, the device 200 establishes wireless connection to such network in the normal mode, so that the device 200 and such network securely communicate with one another in response to the confidential authentication information. After the step 814, the operation ends. Accordingly, such connection is maintained until terminated by either the device 200 or such network. After such termination, the operation of the device 200 returns to the step 802.

Referring again to the step 812, in response to the device 200 determining that such attempted wireless connection was unsuccessful in the normal mode, the operation continues to a step 816. At the step 816, the operation self-loops until the device 200 determines that a waiting period has expired. Such waiting period was specified by the network host of such network in the acceptance message of the step 714 (FIG. 7) as discussed hereinabove. In response to expiration of such waiting period, the operation returns to the step 810.

If the device 200 successfully connects in the normal mode to a network via the cradle 400 (which operates as a wireless interface for the device 200), then the cradle 400 stores the SSID (for configuration mode and/or normal mode) of a network host of such network. If the device 200 is disconnected from the cradle 400, yet is subsequently reconnected to the cradle 400, then the device 200 reads (from the cradle 400) the stored SSID and attempts (via the cradle 400) wireless connection to the same network (if detected by the device 200) before attempting wireless connection to any other network. In that manner, the device 200 is more efficiently reconnected to the same network via the cradle 400.

In one example, the device 200: (a) successfully connects in the normal mode to a first network via a first cradle (which operates as a wireless interface for the device 200) in a first classroom; (b) is disconnected from the first cradle, which continues storing the SSID of a network host of the first network; (c) successfully connects in the normal mode to a second network via a second cradle (which operates as a wireless interface for the device 200) in a second classroom; and (d) is disconnected from the second cradle, which continues storing the SSID of a network host of the second network. In such example: (a) in response to the device 200 being subsequently reconnected to the first cradle, the device 200 (via the first cradle) attempts wireless connection to the first network (if detected by the device 200) before attempting wireless connection to any other network; and (b) in response to the device 200 being subsequently reconnected to the second cradle, the device 200 (via the second cradle) attempts wireless connection to the second network (if detected by the device 200) before attempting wireless connection to any other network. In that manner, the device 200 is more efficiently relocated from the first cradle (in the first classroom) to the second cradle (in the second classroom), and vice versa.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one computing device for wirelessly connecting the device to at least one network, the method comprising:
   wirelessly receiving first and second identifiers contemporaneously from the network, wherein the first identifier indicates that the network operates in a first mode that is not secure, and the second identifier indicates that the network operates in a second mode that is secure;
   determining whether the network previously accepted the device for the second mode;
   in response to the device wirelessly receiving the first and second identifiers, and in response to determining that the network previously accepted the device for the second mode, wirelessly connecting to the network in the first mode;
   while wirelessly connected to the network in the first mode, determining whether the network will accept the device for the second mode;
   while wirelessly connected to the network in the first mode, in response to the device determining that the network will accept the device for the second mode, receiving confidential authentication information and a waiting period from the network; and
   in response to the device determining that the network will accept the device for the second mode, wirelessly connecting to the network in the second mode to securely communicate with the network in response to the confidential authentication information;
   wherein wirelessly connecting to the network in the second mode includes: in response to the device determining that the network will accept the device for the second mode, attempting wireless connection to the network in the second mode; in response to the attempted wireless connection being unsuccessful, determining whether the waiting period has expired; and, in response to an expiration of the waiting period, re-attempting wireless connection to the network in the second mode.

2. The method of claim 1, wherein the confidential authentication information includes at least one of: a password; and an encryption key.

3. The method of claim 1, wherein the device is a handheld computing device.

4. The method of claim 1, wherein determining whether the network previously accepted the device for the second mode includes:
   from a wireless interface, reading at least one of the first and second identifiers to determine that the network previously accepted the device for the second mode.

5. The method of claim 4, wherein the device is removably connectable to the wireless interface.

6. The method of claim 4, wherein the device is integral with the wireless interface.

7. The method of claim 1, wherein wirelessly connecting to the network in the first mode includes:
   in response to the device wirelessly receiving the first and second identifiers, and in response to determining that the network previously accepted the device for the second mode, wirelessly connecting to the network in the first mode before attempting wireless connection to another network.

8. A system for wirelessly connecting to at least one network, the system comprising:
   at least one computing device for: wirelessly receiving first and second identifiers contemporaneously from the network, wherein the first identifier indicates that the network operates in a first mode that is not secure, and the second identifier indicates that the network operates in a second mode that is secure; determining whether the network previously accepted the device for the second mode; in response to the device wirelessly receiving the first and second identifiers, and in response to determining that the network previously accepted the device for the second mode, wirelessly connecting to the network in the first mode; while wirelessly connected to the network in the first mode, determining whether the network will accept the device for the second mode; while wirelessly connected to the network in the first mode, in response to the device determining that the network will accept the device for the second mode, receiving confidential authentication information and a waiting period from the network; and, in response to the device determining that the network will accept the device for the second mode, wirelessly connecting to the network in the second mode to securely communicate with the network in response to the confidential authentication information;

wherein wirelessly connecting to the network in the second mode includes: in response to the device determining that the network will accept the device for the second mode, attempting wireless connection to the network in the second mode; in response to the attempted wireless connection being unsuccessful, determining whether the waiting period has expired; and, in response to an expiration of the waiting period, re-attempting wireless connection to the network in the second mode.

9. The system of claim 8, wherein the confidential authentication information includes at least one of: a password; and an encryption key.

10. The system of claim 8, wherein the device is a handheld computing device.

11. The system of claim 8, wherein determining whether the network previously accepted the device for the second mode includes: from a wireless interface, reading at least one of the first and second identifiers to determine that the network previously accepted the device for the second mode.

12. The system of claim 11, wherein the device is removably connectable to the wireless interface.

13. The system of claim 11, wherein the device is integral with the wireless interface.

14. The system of claim 8, wherein wirelessly connecting to the network in the first mode includes:

in response to the device wirelessly receiving the first and second identifiers, and in response to determining that the network previously accepted the device for the second mode, wirelessly connecting to the network in the first mode before attempting wireless connection to another network.

15. A computer program product for wirelessly connecting at least one computing device to at least one network, the computer program product comprising:

a non-transitory computer-readable storage medium; and a computer-readable program stored on the non-transitory computer-readable storage medium, wherein the computer-readable program is processable by the device for causing the device to perform operations including: wirelessly receiving first and second identifiers contemporaneously from the network, wherein the first identifier indicates that the network operates in a first mode that is not secure, and the second identifier indicates that the network operates in a second mode that is secure; determining whether the network previously accepted the device for the second mode; in response to the device wirelessly receiving the first and second identifiers, and in response to determining that the network previously accepted the device for the second mode, wirelessly connecting to the network in the first mode; while wirelessly connected to the network in the first mode, determining whether the network will accept the device for the second mode; while wirelessly connected to the network in the first mode, in response to the device determining that the network will accept the device for the second mode, receiving confidential authentication information and a waiting period from the network; and, in response to the device determining that the network will accept the device for the second mode, wirelessly connecting to the network in the second mode to securely communicate with the network in response to the confidential authentication information;

wherein wirelessly connecting to the network in the second mode includes: in response to the device determining that the network will accept the device for the second mode, attempting wireless connection to the network in the second mode; in response to the attempted wireless connection being unsuccessful, determining whether the waiting period has expired; and, in response to an expiration of the waiting period, re-attempting wireless connection to the network in the second mode.

16. The computer program product of claim 15, wherein the confidential authentication information includes at least one of: a password; and an encryption key.

17. The computer program product of claim 15, wherein the device is a handheld computing device.

18. The computer program product of claim 15, wherein determining whether the network previously accepted the device for the second mode includes:

from a wireless interface, reading at least one of the first and second identifiers to determine that the network previously accepted the device for the second mode.

19. The computer program product of claim 18, wherein the device is removably connectable to the wireless interface.

20. The computer program product of claim 18, wherein the device is integral with the wireless interface.

21. The computer program product of claim 15, wherein wirelessly connecting to the network in the first mode includes:

in response to the device wirelessly receiving the first and second identifiers, and in response to determining that the network previously accepted the device for the second mode, wirelessly connecting to the network in the first mode before attempting wireless connection to another network.

* * * * *